T. G. RENNERFELT.
FRICTION GEARING.
APPLICATION FILED MAY 13, 1918.
1,399,443.
Patented Dec. 6, 1921.
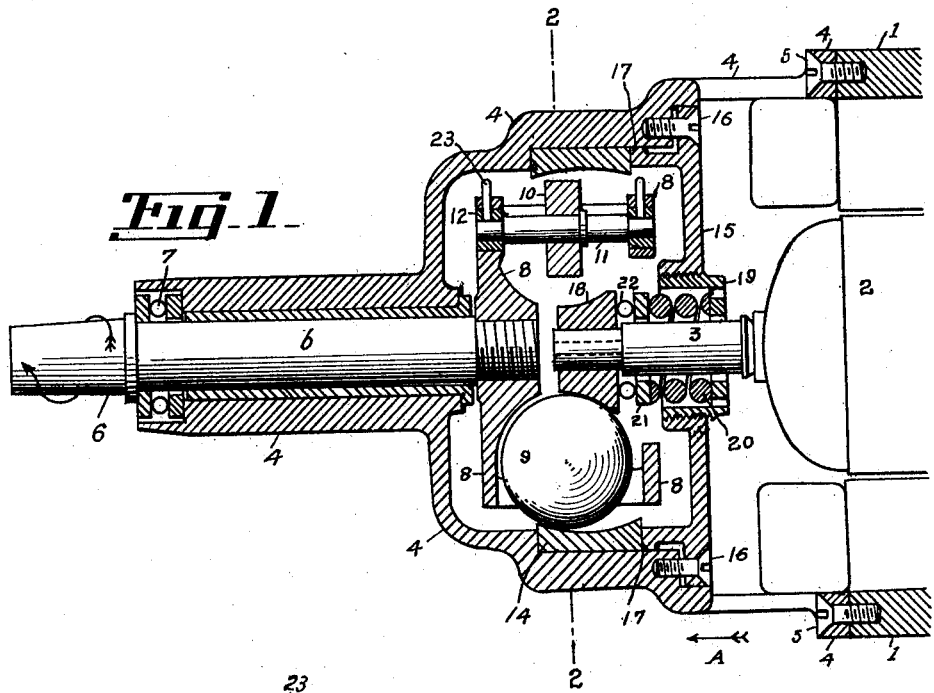
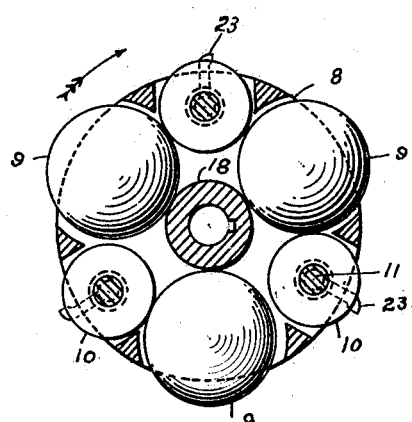
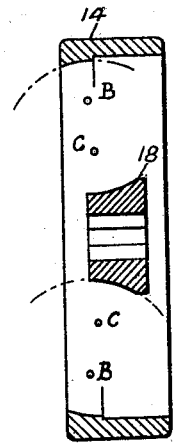
WITNESSES:
E. M. Åström
Eric Alb. Löf
INVENTOR
Ture Gustaf Rennerfelt

UNITED STATES PATENT OFFICE.

TURE GUSTAF RENNERFELT, OF STOCKHOLM, SWEDEN.

FRICTION-GEARING.

1,399,443.  Specification of Letters Patent.  Patented Dec. 6, 1921.

Application filed May 13, 1918. Serial No. 234,175.

*To all whom it may concern:*

Be it known that I, TURE GUSTAF RENNERFELT, subject of the King of Sweden, and resident of Stockholm, in the county of Stockholm and State of Sweden, have invented certain new and useful Improvements in Friction-Gearing, of which the following is a specification.

My invention relates to improvements in friction gearing of the type described in my U. S. Patents 1,017,910 and 1,017,911, Feb. 20, 1912, in which transmission of power is accomplished through the medium of a plurality of spherical rollers which are forced by a pinion against a track. The objects of the invention are first to increase the mechanical efficiency of gearing of this type and to so arrange the parts thereof that the rollers utilized in the gearing shall not become subjected to any wear and second to provide a gearing of this type which may be cheaply constructed and readily made applicable to various uses in the transmission of power.

In the practical operation at high speed of the friction gearing described in the above mentioned patents it is found that the expected percentage of efficiency is not obtained for the reason that the rollers have some tendency to rotate around another axis than the one determined by the studs on which they are mounted. It is also found that the rollers, made of hardened steel and ground to exact dimensions, are rather expensive to manufacture—especially in the small sizes where cheapness is more necessary than in larger sizes.

In the present invention I therefore make use of an arrangement which permits the roller to rotate around a free axis by forming the roller as a complete sphere not mounted on a stud nor restrained in any other way, and in order to prevent sliding of the sphere against any part of the mechanism I provide a separate system of rollers which are rotatively supported from one of the shafts and which sustain or transmit pressure from the balls, but which rollers are not in contact with the track nor with the pinion. In actual practice I employ steel balls of the kind commonly used for ball bearings, which balls can be bought cheaply in the open market.

My invention is illustrated in the accompanying drawing in which Figure 1 shows a longitudinal section of the friction gearing applied to a small electric motor and suitable for the operation of a drill. Fig. 2 is a cross sectional view taken through Fig. 1 on the line 2—2 and as seen looking thereat from right to left in the direction of the arrow A, the track and casing however being left out in this view. Fig. 3 is a detail longitudinal sectional view of the track and pinion.

Referring now to the drawing in detail, 1 represents the frame of the motor to which the gearing is applied. 2 represents the armature or rotor, and 3 the armature shaft. 4 represents the casing of the gearing fastened to the frame as by bolts 5. The drill-shaft denoted by 6, to which power is transmitted from the driving shaft 3, is journaled in the casing in alinement with the shaft 3. Its projecting end is to be fitted with a drill-chuck, and a ballbearing 7 is provided as shown for sustaining the pressure from the drill. Upon the opposite end of the shaft 6 is fastened a yoke 8 formed with pockets, shown clearly in Fig. 2, for the balls 9 and for the rollers 10. The rollers are mounted on studs 11 which are journaled in bushings 12 held in the yoke. 14 denotes the outer race-ring or track which is clamped within the casing by means of the closure plate 15 and bolts 16. Between the yoke and the closure plate is applied a thread of lead 17, or other suitable packing, so that the casing becomes oiltight. 18 denotes the inner race-ring or pinion, which is provided with a keyseat and mounted on the end of the motor-shaft to which a suitable key is fastened. 19 represents a hollow bushing threaded in the closure plate 15. Within the bushing and around the shaft 3 is placed a helical spring 20, arranged to exert pressure between the bushing and the pinion, the pressure being transmitted through the washer 21 and balls 22 placed between the washer and the end of the pinion. Each journal of the studs is provided with a lubricating tube 23 fastened in the yoke and arranged to form a channel for oil from the casing to the journals. The free ends of the tubes are for this purpose bent in the direction of rotation of the yoke, as shown in Fig. 2.

The above described apparatus operates in the following manner: The bushing 19 is screwed suitably far into the closure plate so as to obtain proper pressure of the pinion 18 against the balls 9. Upon rotation of the shaft 3 with the pinion keyed thereto in the direction of the curved arrow the balls which support the pinion will also rotate, and will press against the rollers 10. This pressure against the rollers 10 will cause the yoke, in which they are journaled, to rotate in the direction of the arrow at lower speed. The balls 9 will roll without any friction against any part of the apparatus, and the bearings of the studs will become well lubricated by oil which upon rotation of the yoke is forced through the tubes. The frictional losses in the apparatus will thus be very small, and they will be confined mainly to the journals of the studs where a small amount of wear will not be hurtful. It should be noted from the drawing that the friction gearing is self-contained, and that it can be readily applied for instance to electric motors of various and different designs simply by giving a suitable form to that part of the casing where the bolts 5 are located.

The pinion is ground with a tapering rolling face of which the generatrix is an arc of a circle with center at B in Fig. 3, and thus with a radius a trifle greater than the radius of the ball 9. The rolling face of the track 14 is ground so that the corresponding center is located at C in Fig. 3. It may however be given a greater radius so that the track becomes spherical as shown in Fig. 1. In some cases the track 14 may be formed as an integral part of the casing 4, made of cast iron with the rolling face chilled.

It is evident that the above described apparatus may be used not only for reducing the rotative speed of a shaft, but by making shaft 6 the drive shaft and shaft 3 the driven shaft also for increasing the speed.

What I claim is:

1. Friction gearing for transmission of power between two shafts, embracing a casing, a pinion fastened to one of the shafts, a yoke fastened to the other shaft, a racering clamped within the casing, a plurality of balls between the pinion and the racering, a spring pressed between the casing and the pinion and arranged to force the pinion against the balls, and rollers which make contact with the balls journaled in the yoke and serving to convey the power between the shafts.

2. Friction gearing, embracing a casing, a shaft journaled in the casing, a pinion fastened to the shaft, a track rigidly held within the casing, a plurality of balls between the pinion and the track, means for pressing the pinion against the balls, a second shaft, a yoke fastened to the second shaft, and a plurality of rollers journaled in the yoke and arranged to sustain pressure from the balls and to convey power between the two shafts.

3. Friction gearing, embracing a shaft, a pinion thereon, a concave track, a plurality of balls located between the pinion and the track, a spring for forcing the pinion against the balls, a second shaft, a yoke connected with the second shaft, and a plurality of rollers journaled in the yoke and arranged to sustain pressure from the balls together with means for automatically lubricating the journals of the rollers.

4. Friction gearing embracing an oiltight casing, a shaft, a pinion thereon, a concave track within the casing, a plurality of balls located between the pinion and the track, means for forcing the pinion against the balls, a second shaft, a yoke fastened to the second shaft, a plurality of rollers journaled in the yoke and arranged to transmit pressure from the balls, the yoke being provided with channels for conveying oil from within the casing to the journals of the rollers.

5. Friction gearing embracing a casing, a shaft, a pinion thereon a concave track within the casing, a plurality of balls located between the pinion and the track, a bushing concentric with the shaft and threaded in the casing, and a spring within the bushing arranged to force the pinion against the balls, together with a second shaft operatively connected with the balls.

6. Friction gearing embracing a casing, a shaft journaled in the casing, a pinion mounted on the shaft, a track clamped within the casing, a plurality of balls located between the pinion and the track, means for forcing the pinion against the balls, a second shaft, a yoke fastened thereto, and a plurality of rollers journaled in the yoke, all arranged for transmitting power from one of the shafts to the other one.

7. Friction gearing embracing a casing, a shaft, a pinion thereon, a track clamped within the casing, a plurality of balls pressed by the pinion against the track, a second shaft, a yoke, a plurality of rollers journaled in the yoke, and means for lubricating the journals of the rollers, said rollers being arranged to sustain pressure from the balls and to transmit power between the two shafts.

8. Friction gearing embracing a casing, a shaft, a pinion having a tapering rolling face fastened to the shaft, a concave track held within the casing, a plurality of balls located between the pinion and the track, means for applying pressure in axial direction to the pinion so as to force it against the balls, a second shaft journaled in the casing, a yoke fastened to the second shaft, and a plurality of rollers journaled in the yoke and arranged to sustain the total pressure between the balls and the yoke.

9. Friction gearing embracing an oiltight casing, a shaft, a pinion thereon, a track within the casing, a plurality of balls between the pinion and the track, means for pressing the pinion against the balls, a second shaft journaled in the casing, a yoke fastened thereto, and a plurality of rollers journaled in the yoke and arranged to transmit pressure from the balls, the yoke being provided with channels for conveying oil from within the casing to the journals of the rollers.

10. Friction gearing, embracing a casing, a shaft journaled therein, a pinion having a concave tapering rolling face fastened to the shaft, a concave track within the casing, a plurality of convex rollers in contact with the pinion and with the track, means for applying pressure in axial direction to the pinion so as to force it against the rollers, a second shaft journaled in the casing, a yoke fastened to the second shaft, and a plurality of secondary rollers journaled in the yoke and arranged to sustain the total pressure between the yoke and the first said rollers.

Signed at Stockholm in the county of Stockholm and State of Sweden this 3rd day of April, A. D. 1918.

TURE GUSTAF RENNERFELT.

Witnesses:
H. M. LÖF,
JACOB BAGGE.